(12) United States Patent
Koski (10) Patent No.: US 6,760,176 B2
(45) Date of Patent: Jul. 6, 2004

(54) METHOD AND APPARATUS FOR CALIBRATING A TAPE TRANSPORT SERVO SYSTEM

(75) Inventor: John A. Koski, Livermore, CA (US)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 09/836,018

(22) Filed: Apr. 17, 2001

(65) Prior Publication Data

US 2002/0149872 A1 Oct. 17, 2002

(51) Int. Cl.[7] ................................................ G11B 15/18
(52) U.S. Cl. .................. 360/71; 360/73.01; 360/73.04; 360/74.1
(58) Field of Search ................................ 360/73.03, 75, 360/71, 73.01, 73.04, 74.1; 318/7, 599; 242/334.4

(56) References Cited

U.S. PATENT DOCUMENTS

| | | | |
|---|---|---|---|
| 4,015,799 A | * | 4/1977 | Koski et al. ............. 242/334.4 |
| 4,125,881 A | * | 11/1978 | Eige et al. ..................... 360/50 |
| 4,156,257 A | | 5/1979 | Roberts |
| 4,157,488 A | | 6/1979 | Allan |
| 4,256,996 A | | 3/1981 | Brooks et al. |
| 4,531,166 A | * | 7/1985 | Anderson ................ 360/73.04 |
| 4,801,853 A | | 1/1989 | Lewis et al. |
| 5,310,133 A | | 5/1994 | Falk et al. |
| 5,465,918 A | | 11/1995 | Watanabe |
| 5,720,442 A | * | 2/1998 | Yanagihara et al. ...... 242/334.2 |

FOREIGN PATENT DOCUMENTS

| | | |
|---|---|---|
| JP | 56-44141 | 4/1981 |
| JP | 1-113985 | 5/1989 |
| JP | 09-306060 | 11/1997 |

OTHER PUBLICATIONS

"Measurement of Tape Drive Reel Motor Torque Constants," IBM, Technical Disclosure Bulletin, vol. 37, No. 03, Mar. 1994, pp. 537–539.

* cited by examiner

*Primary Examiner*—David Hudspeth
*Assistant Examiner*—K. Wong
(74) *Attorney, Agent, or Firm*—Crawford Maunu PLLC (57) ABSTRACT

A method for calibrating a tape transport servo system for a tape drive is disclosed. The tape reel motors are excited when the tape drive is not being controlled by the tape transport servo system. Then, calibration data is collected for the motor torque, motor friction, DAC offsets, and pulse width modulator control signal timing.

15 Claims, 11 Drawing Sheets

METHOD AND APPARATUS FOR CALIBRATING A TAPE TRANSPORT SERVO SYSTEM

BACKGROUND OF THE INVENTION

1. Field of the Invention

This invention relates in general to data storage systems, and more particularly to a method and apparatus for calibrating a tape transport servo system.

2. Description of Related Art

Data loss is a serious threat to companies of all sizes, and catastrophic data loss can destroy a business. But most data loss isn't the result of a big disaster, it's caused by human error, viruses, and disk malfunctions. A suitable backup routine provides the best protection against data loss of all kinds. And tape technology remains the most efficient and cost-effective means to perform system backup, whether for a small business or a global 24×7 operation.

Tape remains unrivaled in terms of cost and capacity for data storage, and should play an increasing crucial role in corporate data protection strategies. No other technology offers the same combined low cost and high capacity advantage of tape. While other technologies may offer strengths in one or more areas, overall, they do not meet the entire set of customer needs that tape addresses.

Tape drives make backup fast, easy, reliable and affordable. Speed is critical because your data is constantly growing while the time available for backup is shrinking. Even the slowest tape drive writes 1 MB per second and the fastest 30 MB per second, which means a 200 GB backup can be completed in less than two hours. Furthermore, unlike other storage methods, tape drives offer a range of media that allows you to back up all the data on a small to medium-sized server. Tape backup also captures system setup information, as well as data, allowing an entire system to be restored in the event a disaster strikes. Also, backups can be scheduled to occur automatically at a time determined to be most convenient.

Another area where tape storage excels is when it comes to data protection. Tape has proved itself a reliable medium, and tape drives themselves have never been more reliable. Easily portable, tapes have the added advantage of being simple to remove and store offsite, so keeping a disaster recovery copy is less of a burden. In terms of affordability, tape is the most cost-effective way to store large amounts of data per gigabyte of storage. The compact size of tape cartridges also helps keep down your storage costs.

Modern tape transport servo systems which move tape directly from one tape reel to the other in order to transport tape over the recording head must control tape tension, position and velocity to the requirements of the head to tape interface. The servo control parameters at the recording head, namely tension, velocity and position, must be directly controlled by the reel drive motors. In low cost tape drives, the high resolution tachometers associated with reel motor control are eliminated, and the control problem is made more difficult. In addition, as tape thickness is reduced to increase tape length and cartridge data capacity, it is necessary to reduce the nominal tension level in the tape transport to avoid overstressing the thin tape.

The electrical and mechanical component tolerances in the two motor control channels of a tape transport system typically are +/−15% of the nominal component values. In addition, there are some parameters, such as motor friction, which are not well specified, and which can vary by large amounts, typically factors of 2 or 3 to 1. The motor friction is a critical mechanical parameter in the control of tape tension, and directly changes the tension at the head if it varies from the assumed value in the control system.

It can be seen then that there is a need for a method and apparatus to calibrate the motor analog channel circuits, the motor power drivers, and the motor electromechanical parameters, in order to reduce the manufacturing tolerances, purchase tolerances and time varying parameters that directly affect tension, velocity and position control.

SUMMARY OF THE INVENTION

To overcome the limitations in the prior art described above, and to overcome other limitations that will become apparent upon reading and understanding the present specification, the present invention discloses a method and apparatus for calibrating a tape transport servo system.

The present invention solves the above-described problems by exciting the two reel motors of the tape transport at a time when tape is not being controlled by the servo system and gathering calibration data during this time.

A method in accordance with the principles of the present invention includes a exciting tape reel motors when the tape drive is not being controlled by the tape transport servo system and collecting calibration data for the motor torque, motor friction, DAC offsets, and pulse width modulator control signal timing.

Other embodiments of a method in accordance with the principles of the invention may include alternative or optional additional aspects. One such aspect of the present invention is that the collecting of calibration data for the pulse width modulator (PWM) control signal timing further includes enabling the drive amplifiers to activate the pulse width modulator control signals, measuring the on-time and the off-time for the pulse width modulator control signal, averaging the on-time and off-time measurements to reduce measurement noise and storing the averaged measured values for each reel motor driver.

Another aspect of the present invention is that the collecting of calibration data for the motor friction and DAC offsets further includes setting reel motors at a constant speed in a forward direction, when constant speed in the forward direction has been established, accumulating a value of each of the motor drive DACs at predetermined time intervals for a preset time period, at the end of the preset time period, storing the motor friction values into motor friction registers, wherein the value stored in the motor friction register represent the number of predetermined time intervals collected times the forward friction current for the motors, copying accumulated DAC values into DAC offset calibration registers, setting reel motors at constant speed in the backward direction, when constant speed in the backward direction has been established, accumulating a value of each of the motor drive DACs at the predetermined time intervals for the preset period of time, subtracting DAC values collected in the backward direction from the DAC values copied into the DAC offset registers after the forward collection and dividing the values of the motor friction registers and the DAC offset registers by the sum of the number of predetermined time intervals spanning the forward and backward collection to yield the final values for calibration of motor friction and DAC offset.

Another aspect of the present invention is that the collecting of calibration data for the motor torque further includes setting motor drive DACs to zero when the motors are rotating in the forward direction so that motor current is set at zero and the motors are coasting in a forward direction, measuring the motor torque constants for the forward direction by integrating the motor generated voltage over a fixed angle of motor rotation for each motor, storing the integrated motor torque constant from the forward measurement in a motor voltage integration register for each motor, setting motor drive DACs to zero when the motors are rotating in the backward direction so that motor current is set at zero and the motors are coasting in a backward direction, measuring the motor torque constants for the backward direction by integrating the motor generated voltage over a fixed angle of motor rotation for each motor and storing the integrated motor torque constant from the backward measurement in a motor voltage integration register for each motor to arrive at an integral of motor voltage over two revolutions.

Another aspect of the present invention is that the collecting of calibration data for the motor friction and DAC offsets further includes setting reel motors at a constant speed in a forward direction, when constant speed in the forward direction has been established, accumulating a value of each of the motor drive DACs at predetermined time intervals for a preset time period, at the end of the preset time period, storing the motor friction values into motor friction registers, wherein the value stored in the motor friction register represent the number of predetermined time intervals collected times the forward friction current for the motors, copying accumulated DAC values into DAC offset calibration registers, setting reel motors at constant speed in the backward direction, when constant speed in the backward direction has been established, accumulating a value of each of the motor drive DACs at the predetermined time intervals for the preset period of time, subtracting DAC values collected in the backward direction from the DAC values copied into the DAC offset registers after the forward collection and dividing the values of the motor friction registers and the DAC offset registers by the sum of the number of predetermined time intervals spanning the forward and backward collection to yield the final values for calibration of motor friction and DAC offset.

Another aspect of the present invention is that the collecting of calibration data for the motor torque further includes setting motor drive DACs to zero when the motors are rotating in the forward direction so that motor current is set at zero and the motors are coasting in a forward direction, measuring the motor torque constants for the forward direction by integrating the motor generated voltage over a fixed angle of motor rotation for each motor, storing the integrated motor torque constant from the forward measurement in a motor voltage integration register for each motor, setting motor drive DACs to zero when the motors are rotating in the backward direction so that motor current is set at zero and the motors are coasting in a backward direction, measuring the motor torque constants for the backward direction by integrating the motor generated voltage over a fixed angle of motor rotation for each motor and storing the integrated motor torque constant from the backward measurement in a motor voltage integration register for each motor to arrive at an integral of motor voltage over two revolutions.

In another embodiment of the present invention a method for calibrating pulse width modulator control signal timing is disclosed. The method includes exciting tape reel motors when the tape drive is not being controlled by the tape transport servo system and collecting calibration data for the pulse width modulator control signal timing by enabling the drive amplifiers to activate the pulse width modulator control signals, measuring the on-time and the off-time for the pulse width modulator control signal, averaging the on-time and off-time measurements to reduce measurement noise and storing the averaged measured values for each reel motor driver.

In another embodiment of the present invention a method for calibrating motor friction and DAC offsets is disclosed. The method includes exciting tape reel motors when the tape drive is not being controlled by the tape transport servo system and collecting calibration data for motor friction and DAC offsets by setting reel motors at a constant speed in a forward direction, accumulating a value of each of the motor drive DACs at predetermined time intervals for a preset time period when constant speed in the forward direction has been established, storing the motor friction values into motor friction registers at the end of the preset time period, wherein the value stored in the motor friction register represent the number of predetermined time intervals collected times the forward friction current for the motors, copying accumulated DAC values into DAC offset calibration registers, setting reel motors at constant speed in the backward direction, accumulating a value of each of the motor drive DACs at the predetermined time intervals for the preset period of time when constant speed in the backward direction has been established, subtracting DAC values collected in the backward direction from the DAC values copied into the DAC offset registers after the forward collection and dividing the values of the motor friction registers and the DAC offset registers by the sum of the number of predetermined time intervals spanning the forward and backward collection to yield the final values for calibration of motor friction and DAC offset.

In another embodiment of the present invention a method for calibrating the motor torque is disclosed. The method includes exciting tape reel motors when the tape drive is not being controlled by the tape transport servo system and collecting calibration data for the motor torque by setting motor drive DACs to zero when the motors are rotating in the forward direction so that motor current is set at zero and the motors are coasting in a forward direction, measuring the motor torque constants for the forward direction by integrating the motor generated voltage over a fixed angle of motor rotation for each motor, storing the integrated motor torque constant from the forward measurement in a motor voltage integration register for each motor, setting motor drive DACs to zero when the motors are rotating in the backward direction so that motor current is set at zero and the motors are coasting in a backward direction, measuring the motor torque constants for the backward direction by integrating the motor generated voltage over a fixed angle of motor rotation for each motor and storing the integrated motor torque constant from the backward measurement in a motor voltage integration register for each motor to arrive at an integral of motor voltage over two revolutions.

In another embodiment of the present invention a method for calibrating a tape transport servo system for a tape drive is disclosed. The method includes clearing motor calibration data, performing pulse width modulator control signal timing measurements to obtain offset timings for each of the reel motors, accelerating the reel motors up to speed in the forward direction to collect DAC offset data, motor friction data and motor torque data, accelerating the reel motors up to speed in the backward direction to collect DAC offset data, motor friction data and motor torque data, processing the gathered calibration parameters for the pulse width modulator control signal timing, DAC offsets, the motor friction and the motor torque to arrive at final calibration data for use in the tape transport servo control system and storing the final calibration data into a calibration data structure.

Another aspect of the present invention is that the processing further comprises scaling the motor torque constant for use in the tape transport servo control system, wherein the scale factor for torque constant from summation of e(t) over two revolutions is given by SF=(total angle)*(volt-scale-factor)*(1/torque-Q-factor)*(sample-frequency).

In another embodiment of the present invention a tape drive is disclosed. The tape drive includes a controller configured to calibrate a tape transport servo system by exciting tape reel motors when the tape drive is not being controlled by the tape transport servo system and collecting calibration data for the motor torque, motor friction, DAC offsets, and pulse width modulator control signal timing.

In another embodiment of the present invention a tape drive is disclosed. The tape drive includes a controller configured to calibrate a tape transport servo system by clearing motor calibration data, performing pulse width modulator control signal timing measurements to obtain offset timings for each of the reel motors, accelerating the reel motors up to speed in the forward direction to collect DAC offset data, motor friction data and motor torque data, accelerating the reel motors up to speed in the backward direction to collect DAC offset data, motor friction data and motor torque data, processing the gathered calibration parameters for the pulse width modulator control signal timing, DAC offsets, the motor friction and the motor torque to arrive at final calibration data for use in the tape transport servo control system and storing the final calibration data into a calibration data structure.

In another embodiment of the present invention an article of manufacture comprising a program storage medium readable by a computer is disclosed. The medium tangibly embodies one or more programs of instructions executable by the computer to perform a method for calibrating a tape transport servo system, wherein the method includes exciting tape reel motors when the tape drive is not being controlled by the tape transport servo system and collecting calibration data for the motor torque, motor friction, DAC offsets, and pulse width modulator control signal timing.

In another embodiment of the present invention an article of manufacture comprising a program storage medium readable by a computer is disclosed. The medium tangibly embodies one or more programs of instructions executable by the computer to perform a method for calibrating a tape transport servo system, wherein the method includes clearing motor calibration data, performing pulse width modulator control signal timing measurements to obtain offset timings for each of the reel motors, accelerating the reel motors up to speed in the forward direction to collect DAC offset data, motor friction data and motor torque data, accelerating the reel motors up to speed in the backward direction to collect DAC offset data, motor friction data and motor torque data, processing the gathered calibration parameters for the pulse width modulator control signal timing, DAC offsets, the motor friction and the motor torque to arrive at final calibration data for use in the tape transport servo control system and storing the final calibration data into a calibration data structure.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for calibrating a tape transport servo system. The method described here is to excite the two reel motors of the tape transport at a time when tape is not being controlled by the servo system. This can be accomplished, for example, by exciting the two reel motors after a tape cartridge has been ejected from the tape drive, and before a new tape cartridge is inserted into the tape drive. This process calibrates the motors, the motor driver amplifiers, and the analog circuits including the digital to analog convertors (DACs). The electrical and mechanical component tolerances in the two motor control channels of a tape transport system typically are +/−15% of the nominal component values. In addition, there are some parameters, such as motor friction, which are not well specified, and which can vary by large amounts, typically factors of 2 or 3 to 1. The motor friction is a critical mechanical parameter in the control of tape tension, and directly changes the tension at the head if it varies from the assumed value in the control system.

Figure 1:
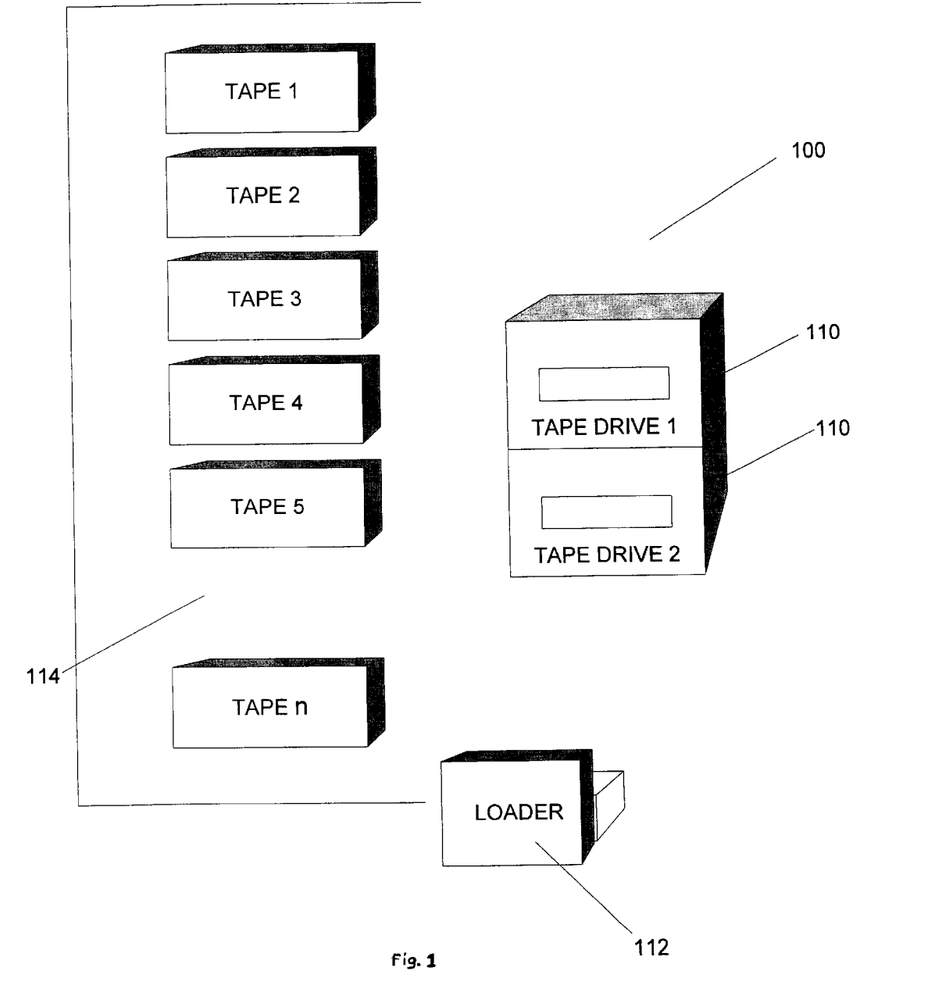
FIG. 1 illustrates a tape library system according to the present invention.

FIG. 1 illustrates a tape library system 100. The tape library system 100 includes at least one tape drive 110, a loader 112, and a library of tape cassettes or cartridges 114 that can be accessed by the loader 112 so as to load the tape drive 110 with an appropriately identified tape cassette or cartridge.

Figure 2:
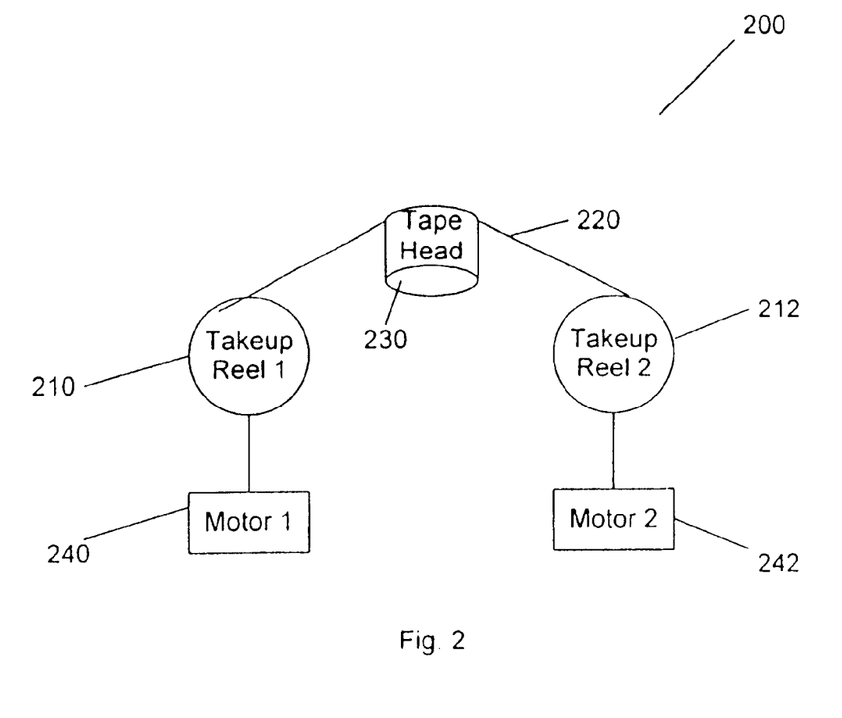
FIG. 2 illustrates a tape system according to the present invention.

FIG. 2 illustrates a tape system 200. The tape system 200 includes a first and second takeup reel 210, 212. Magnetic recording tape 220 is spooled on the first and second takeup reels 210, 212. The magnetic recording tape 220 is routed over a tape read/write head 230 for reading and writing data on the magnetic recording tape 220. Takeup reel motors 240, 242 control the positioning of the magnetic recording tape 220 over the tape read/write head 230.

Figure 3:
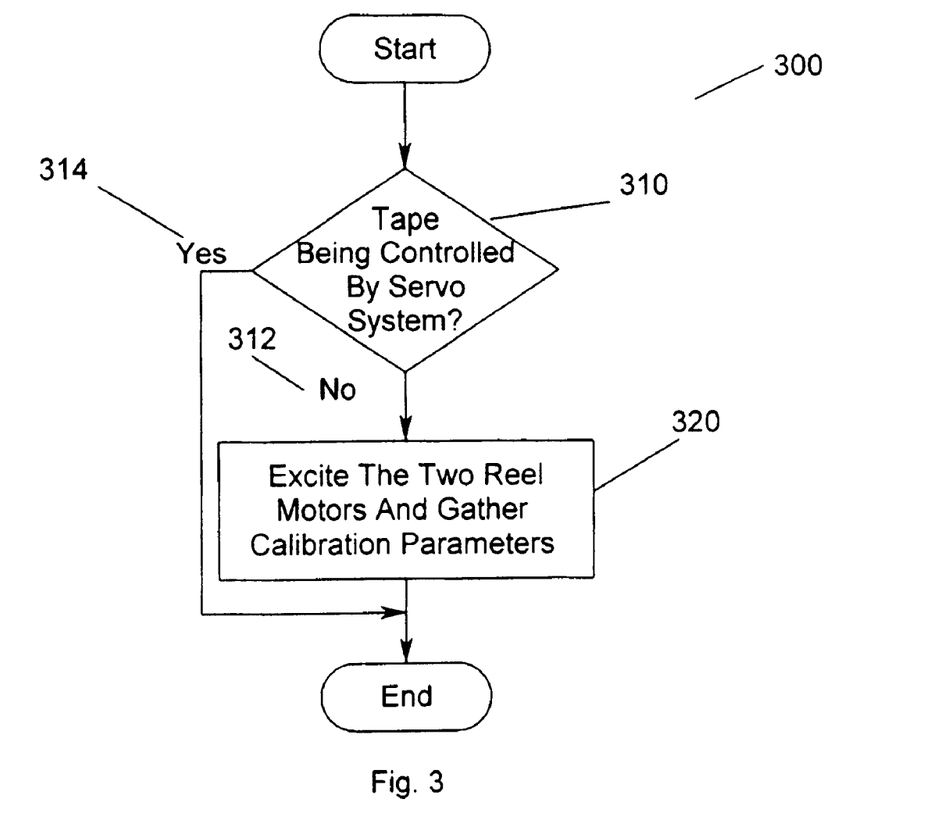
FIG. 3 is a flow chart illustrating the basic process for calibrating a tape transport servo system according to the present invention.

FIG. 3 is a flow chart 300 illustrating the basic process for calibrating a tape transport servo system according to the present invention. First, a determination is made whether the tape drive is being controlled by the servo system 310. According to the present invention, calibration does not initiate when the two reel motors of the tape transport are being controlled by the servo system 314. If the two reel motors of the tape transport are not being controlled by the servo system 312, then the two reel motors are excited and calibration data is obtained 320. This can be accomplished, for example, by exciting the two reel motors after a tape cartridge has been ejected from the tape drive, and before a new tape cartridge is inserted into the tape drive.

Figure 4:
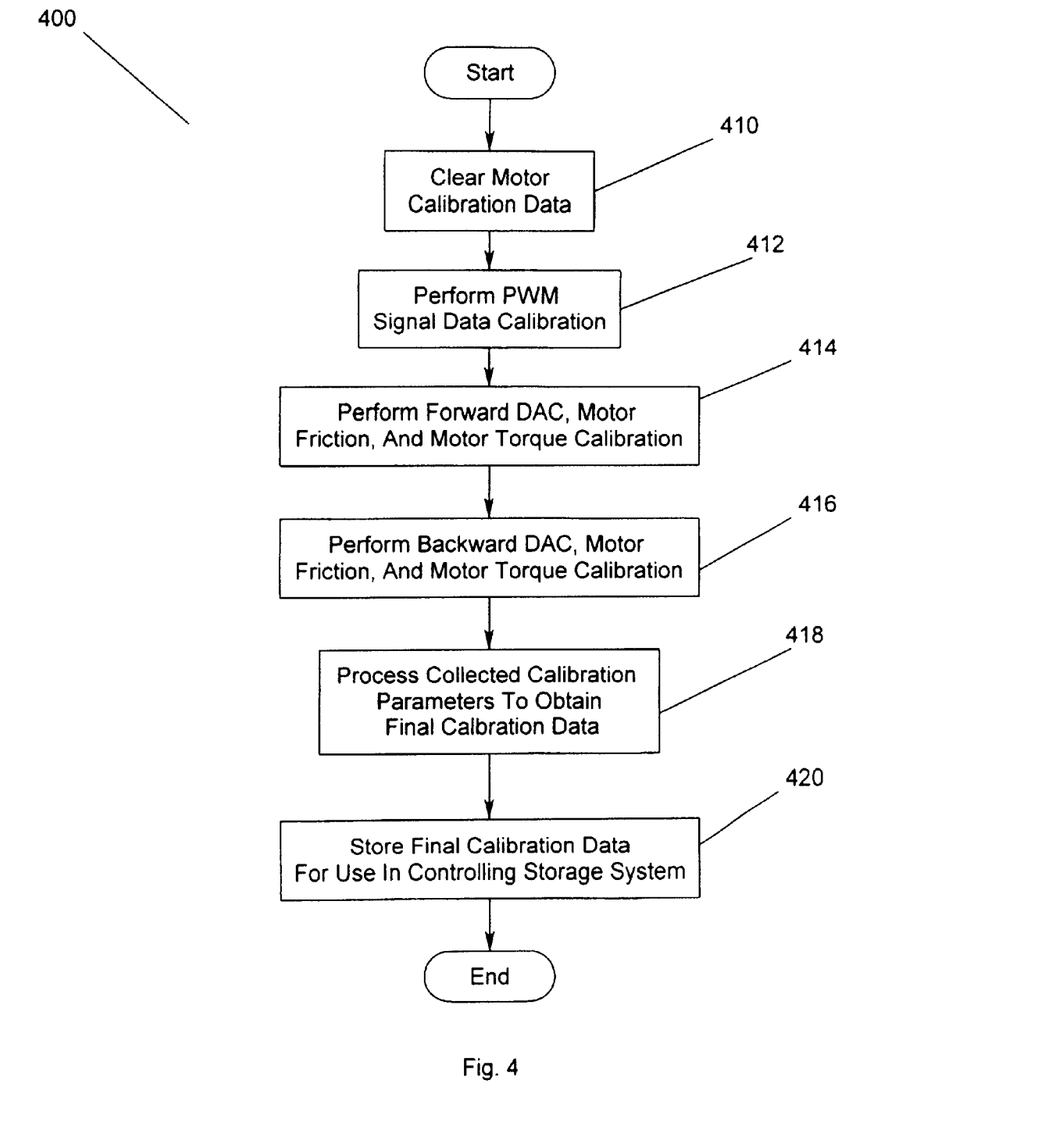
FIG. 4 illustrates a more detailed flow chart of the method for calibrating a tape transport servo system according to the present invention.

FIG. 4 illustrates a more detailed flow chart 400 of the method for calibrating a tape transport servo system according to the present invention. First, the motor calibration data structure is cleared for a new measurement process. The motors are allowed to stop and remain motionless 410.

The parameters that are most important to tape transport servo system, and which must be addressed by calibration, are motor torque constant, motor coulomb friction, and DAC offset. In the new LTO tape transport control system, the implementation of the secondary velocity computation method enables the removal of the fine resolution tachometers. This secondary velocity computation method however, requires monitoring the motor power amplifier signals to compute secondary velocity. These signals are the pulse width modulator (PWM) control signals, and accurate computation of secondary velocity requires calibration of these PWM signals. Mainly, the PWM timings must be calibrated for offset timings. Therefore, the PWM signal data is collected 412. This PWM isgnal calibration is conducted when the motors are stationary, not rotating.

The motors are then accelerated up to speed in the forward direction to begin the process of measuring the motor frictions, DAC offsets, and motor torque constants for the forward direction 414. After collecting forward data regarding the motor frictions, DAC offsets, and motor torque constants, the motors are stopped and then accelerated up to speed in the backward or opposite direction to begin the process of measuring the motor frictions, DAC offsets, and motor torque constants for the backward direction 416.

Next, the gathered calibration parameters are processed to obtain final calibration data for use in the tape transport servo control system 418. A computation is then done to properly scale the motor torque constant for use in the tape transport servo control system. The scale Factor for torque constant from summation of e(t) over two revolutions (4*pi radians) is given by:

SF=(total angle)*(volt-scale-factor)*(1/torque-Q-factor)*(sample-frequency);

or

655=(4*pi)*(2^15/12)*(1/2^16)*1250 and:

inb-Kt=Inboard motor voltage integral register/655,
out-Kt=Outboard motor voltage integral register/655.

Finally, all the calibration data that has been measured is stored into the calibration data structure 420.

Figure 5:
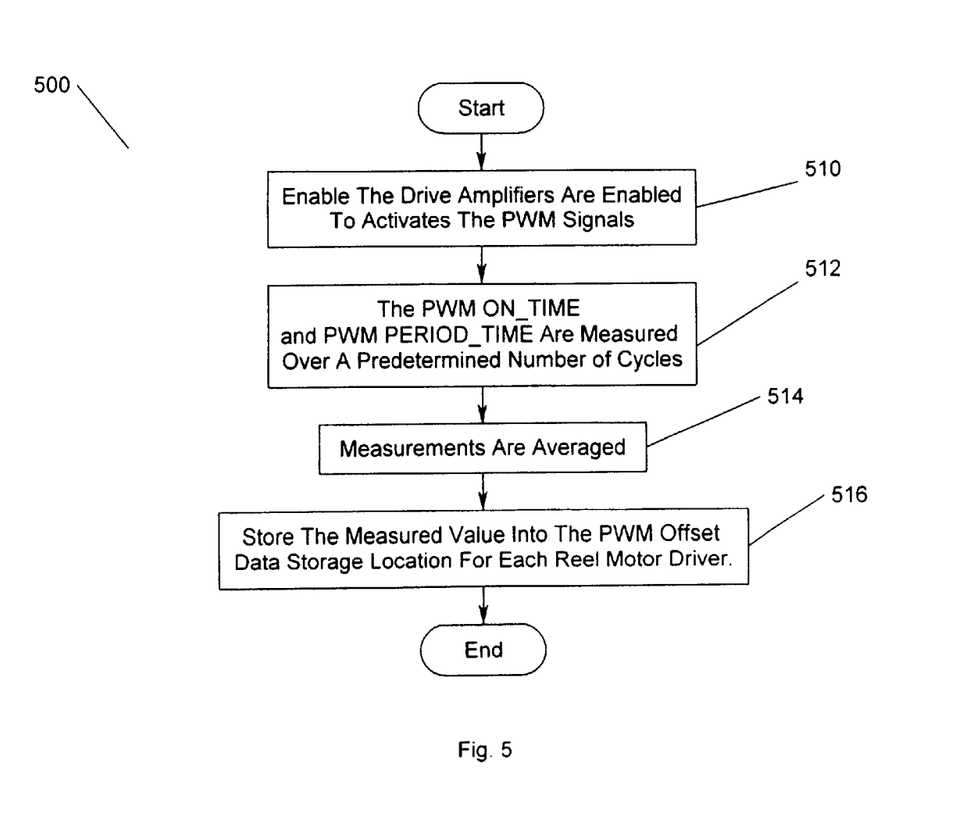
FIG. 5 is a flow chart illustrating the process for calibrating the PWM timings for offset timings according to the present invention.

FIG. 5 is a flow chart 500 illustrating the process for calibrating the PWM timings for offset timings according to the present invention. The drive amplifiers are enabled which activates the PWM signals 510. The PWM ON-TIME and PWM PERIOD-TIME are measured 512. These times are computed in hardware counters and represent the time the PWM signals remain on or TRUE, and the time for a full period of the PWM signal. The measurements are made over a large number of PWM cycles and averaged to reduce measurement noise 514. For example, 256 measurements are made and averaged. The measured value is then stored into the PWM offset data storage location for each reel motor driver 516.

Figure 6:
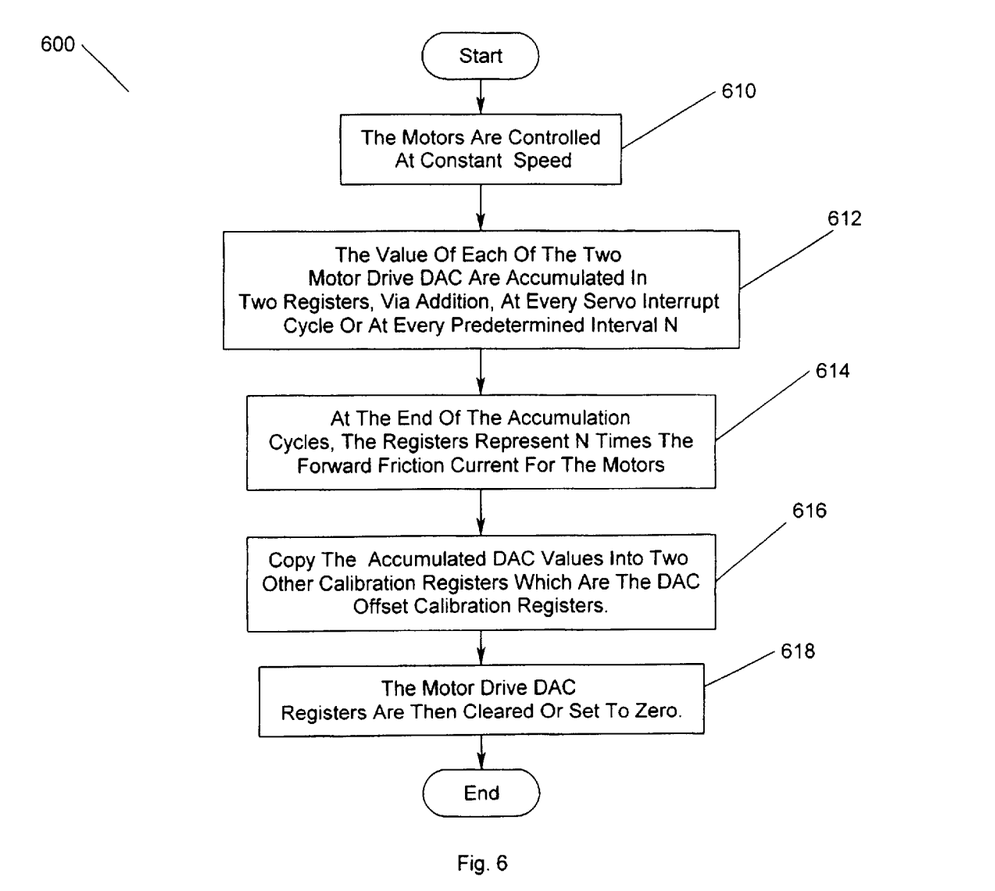
FIG. 6 is flow chart of the forward DAC and motor friction parameter calibration according to the present invention.

FIG. 6 is flow chart 600 of the forward DAC and motor friction parameter calibration according to the present invention. The motors are controlled at constant speed, for instance 140 radians per second 610. When constant speed has been established, the value of each of the two motor drive DAC are accumulated in two registers, via addition, at every servo interrupt cycle or every predetermined time interval N, e.g., 800 microseconds 612. This accumulation is continued for a fixed number of interrupts, for instance 256 interrupts, to provide averaging and noise immunity for the measurement. At the end of the accumulation cycles, the registers represent 256 times the forward friction current for the motors 614. The accumulated DAC values are also copied into two other calibration registers which are the DAC offset calibration registers 616. The motor drive DAC registers are then cleared or set to zero 618.

Figure 7:
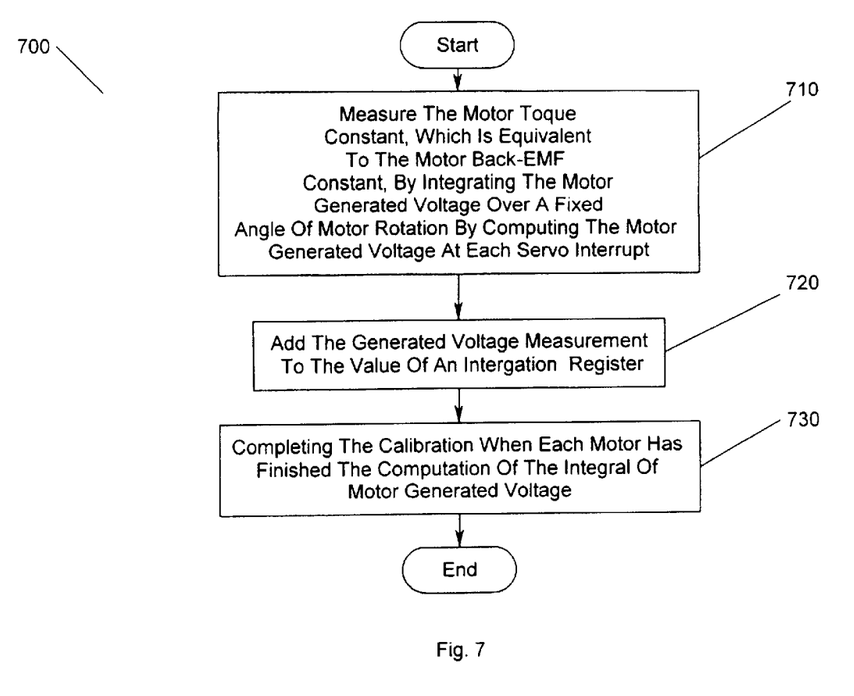
FIG. 7 is a flow chart for measuring the forward motor torque according to the present invention.

FIG. 7 is a flow chart 700 for measuring the forward motor torque according to the present invention. With the motor drive DACs set to zero, the motor current at zero, and the motors coasting, thereby slowly decreasing in speed by friction torques, the motor torque constants are measured for the forward direction. First, the motor toque constant, which is equivalent to the motor back-EMF constant, is measured by integrating the motor generated voltage over a fixed angle of motor rotation 710. This is accomplished by computing the motor generated voltage at each servo interrupt, and adding the generated voltage measurement to the value of an integration register 720. The summation continues for one full revolution of each motor, by using a rotation index pulse for each motor to start the measurement on it's first occurrence, and ending the measurement on it's second occurrence. When each motor has completed the computation of the integral of motor generated voltage, this calibration step is complete 730.

Figure 8:
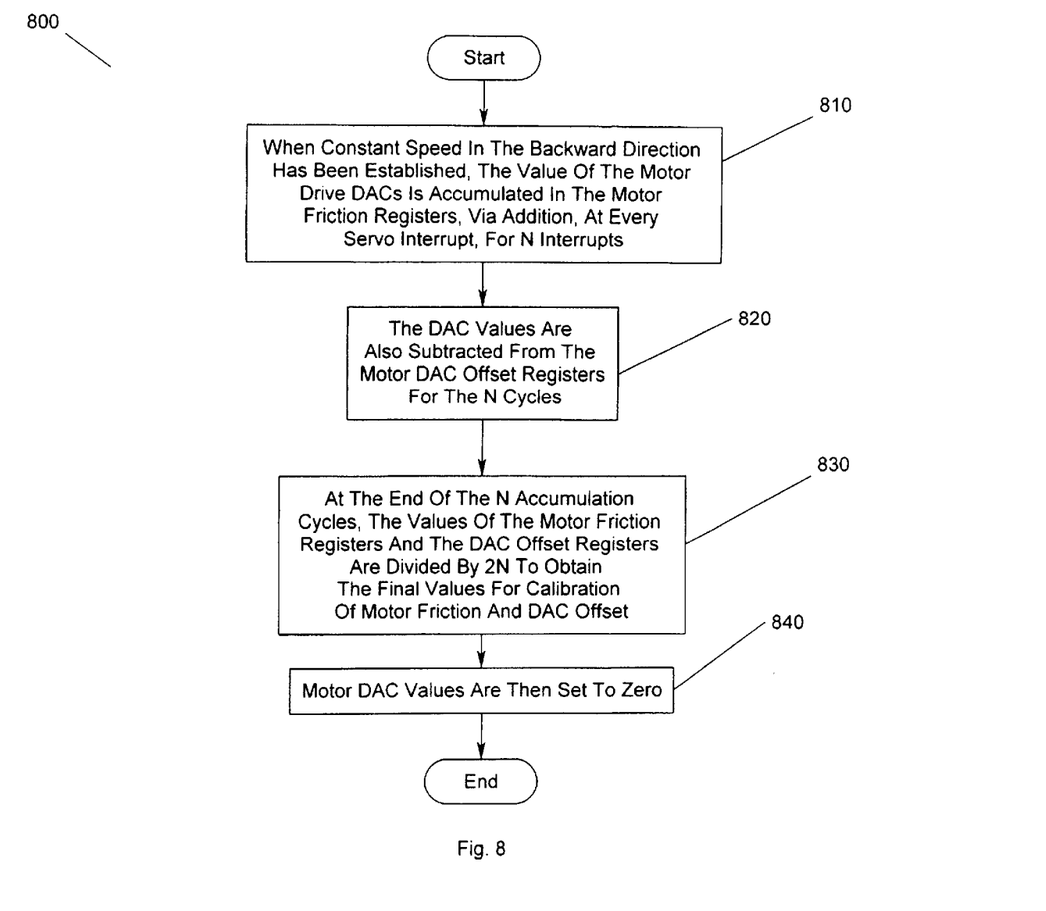
FIG. 8 is flow chart of the backward DAC and motor friction parameter calibration according to the present invention.

FIG. 8 is flow chart 800 of the backward DAC and motor friction parameter calibration according to the present invention. The motors are controlled at constant speed, (140 radians per second) in the backward direction. When constant speed has been established, the value of the motor drive DACs is accumulated in the motor friction registers, via addition, at every servo interrupt, for N interrupts, e.g., 256 interrupts 810. The DAC values are also subtracted from the motor DAC offset registers for the 256 cycles 820. At the end of the 256 accumulation cycles, the values of the motor friction registers and the DAC offset registers are divided by 512 (shifted right 9 times), yielding the final values for calibration of motor friction and DAC offset 830. The, the motor DAC values are set to zero 840.

Figure 9:
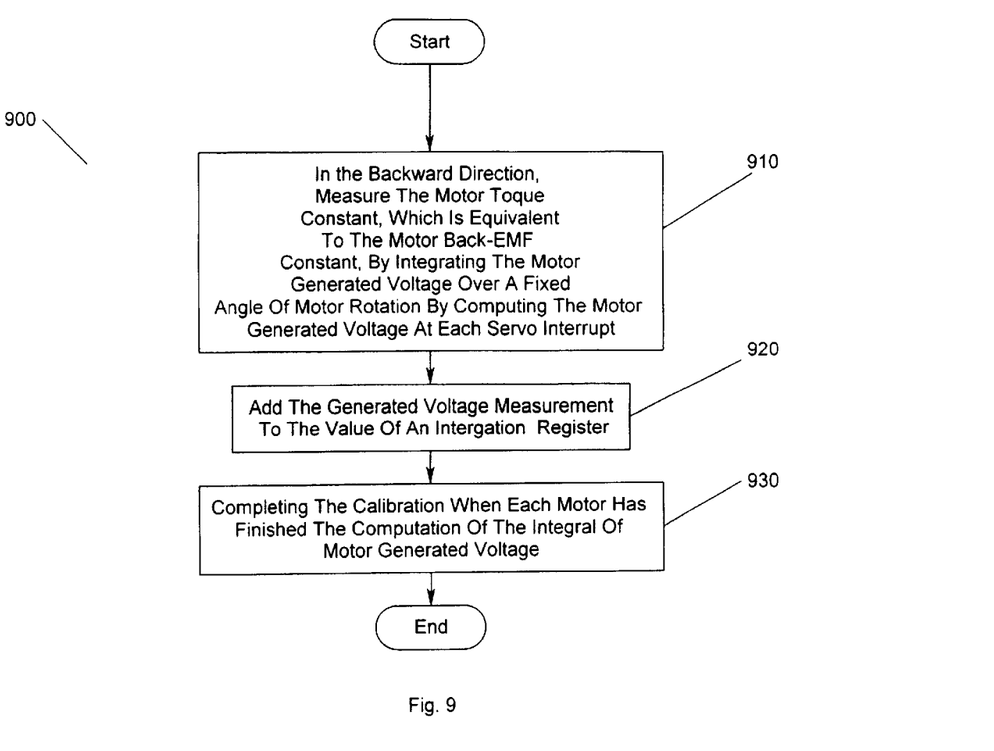
FIG. 9 is a flow chart for measuring the forward motor torque according to the present invention.

FIG. 9 is a flow chart 900 for measuring the forward motor torque according to the present invention. The calibration measurement of the motor torque constant for the reverse direction continues in the same manner as described in FIG. 7 but with the motor moving in the backward direction. The motor toque constant, which is equivalent to the motor back-EMF constant, is measured by integrating the motor generated voltage over a fixed angle of motor rotation 910. This is accomplished by computing the motor generated voltage at each servo interrupt, and adding the generated voltage measurement to the value of an integration register 920. The summation continues for one full revolution of each motor, by using a rotation index pulse for each motor to start the measurement on it's first occurrence, and ending the measurement on it's second occurrence. When each motor has completed the computation of the integral of motor generated voltage, this calibration step is complete 930. The two motor voltage integration registers now contain the integral of motor voltage over two revolutions, or 4*pi radians of position.

Figure 10:
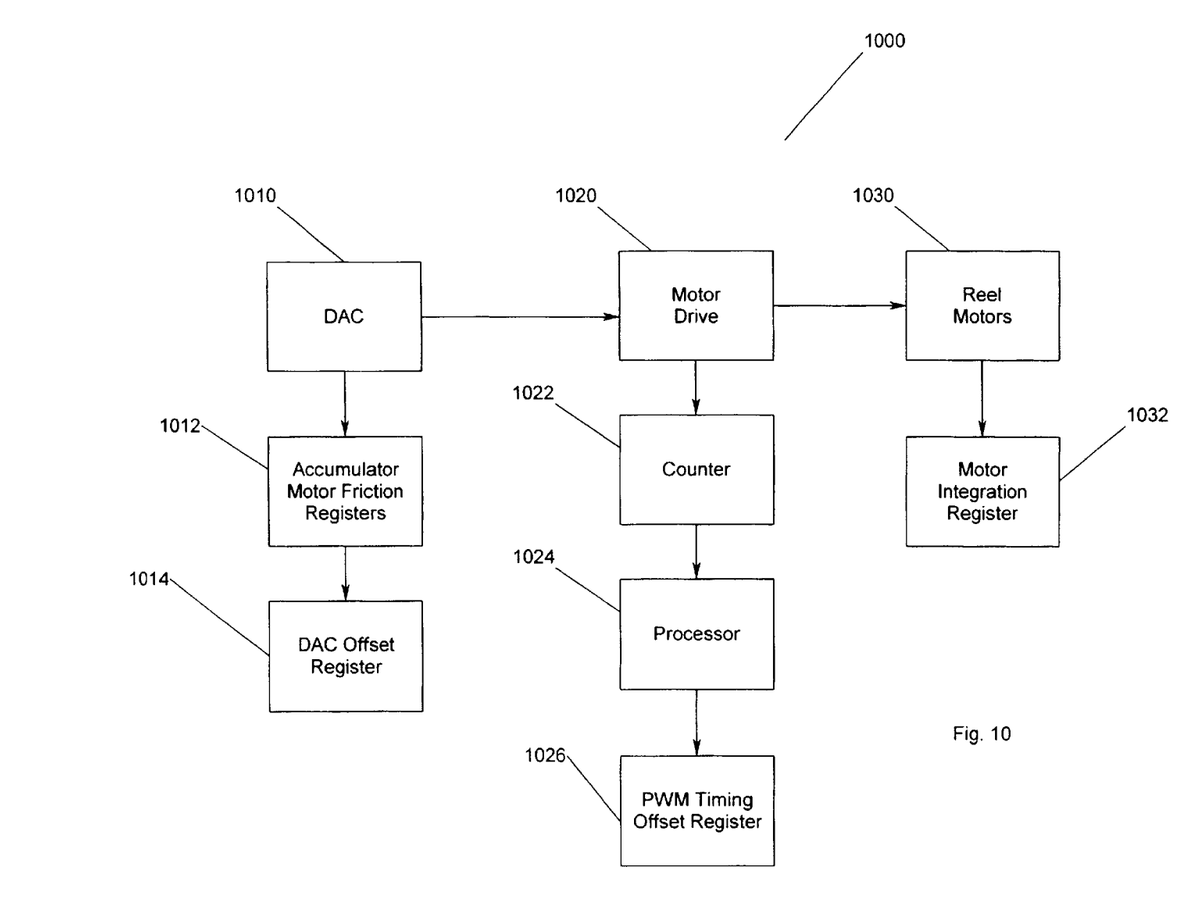
FIG. 10 illustrates a block diagram of the storage system 1000 configured for calibrating a tape transport servo system according to the present invention.

FIG. 10 illustrates a block diagram of the storage system 1000 configured for calibrating a tape transport servo system according to the present invention. As described above, when constant speed has been established, the value of each of the two motor drive DACs 1010 are accumulated in two registers 1012 The accumulated DAC values are also copied into two other calibration registers which are the DAC offset calibration registers 1014.

The PWM signals from the motor drivers 1020 are computed in hardware counters 1022 and represent the time the PWM signals remain on. The measurements are made over a large number of PWM cycles and averaged by a processor 1024. The measured value is then stored into the PWM offset data storage location 1026 for each reel motor driver.

The torque constants of the reel motors 1030 are measured for the forward direction in the following manner. The motor toque constant, which is equivalent to the motor back-EMF constant, is measured by integrating the motor generated voltage over a fixed angle of motor rotation. This is accomplished by computing the motor generated voltage at each servo interrupt, and adding the generated voltage measurement to the value of an integration register 1032. The summation continues for one full revolution of each motor.

The process is repeated in the backward direction and a computation is then done to properly scale the motor torque constant for use in the tape transport servo control system.

Figure 11:
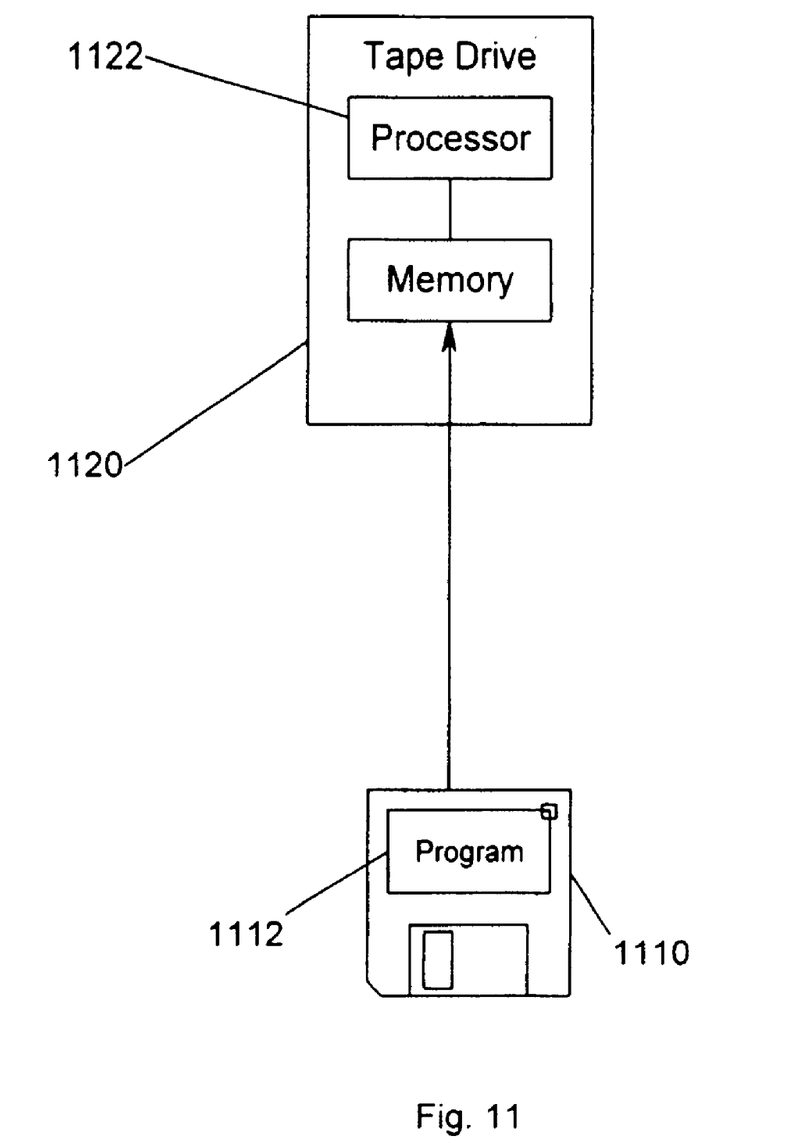
FIG. 11 is a block diagram that illustrates an exemplary hardware environment for calibrating a tape transport servo system according to the present invention.

The process illustrated with reference to FIGS. 3–9 may be tangibly embodied in a computer-readable medium or carrier, e.g. one or more of the fixed and/or removable data storage devices 1110 illustrated in FIG. 11, or other data storage or data communications devices. A computer program 1112 on the storage device 1110 may be loaded into the memory 1114 or into the storage device 1110 to configure the storage system 110, as illustrated in FIG. 1, for execution. The computer program 1112 comprise instructions which, when read and executed by a processor 1122 of the tape drive 110, as illustrated in FIG. 1, causes the tape drive 110, as illustrated in FIG. 1, to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for calibrating a tape transport servo system for a tape drive, comprising:
    exciting tape reel motors when the tape drive is not being controlled by the tape transport servo system; and
    collecting calibration data for the motor torque, motor friction, DAC offsets, and pulse width modulator control signal timing.

2. The method of claim 1 wherein the collecting of calibration data for the pulse width modulator (PWM) control signal timing further comprises:
    enabling the drive amplifiers to activate the pulse width modulator control signals;
    measuring the on-time and the off-time for the pulse width modulator control signal;
    averaging the on-time and off-time measurements to reduce measurement noise; and
    storing the averaged measured values for each reel motor driver.

3. The method of claim 2 wherein the collecting of calibration data for the motor friction and DAC offsets further comprises:
    setting reel motors at a constant speed in a forward direction;
    when constant speed in the forward direction has been established, accumulating a value of each of the motor drive DACs at predetermined time intervals for a preset time period;
    at the end of the preset time period, storing the motor friction values into motor friction registers, wherein the value stored in the motor friction register represent the number of predetermined time intervals collected times the forward friction current for the motors;
    copying accumulated DAC values into DAC offset calibration registers;
    setting reel motors at constant speed in the backward direction;
    when constant speed in the backward direction has been established, accumulating a value of each of the motor drive DACs at the predetermined time intervals for the preset period of time;
    subtracting DAC values collected in the backward direction from the DAC values copied into the DAC offset registers after the forward collection; and
    dividing the values of the motor friction registers and the DAC offset registers by the sum of the number of predetermined time intervals spanning the forward and backward collection to yield the final values for calibration of motor friction and DAC offset.

4. The method of claim 3 wherein the collecting of calibration data for the motor torque further comprises:
    setting motor drive DACs to zero when the motors are rotating in the forward direction so that motor current is set at zero and the motors are coasting in a forward direction;
    measuring the motor torque constants for the forward direction by integrating the motor generated voltage over a fixed angle of motor rotation for each motor;
    storing the integrated motor torque constant from the forward measurement in a motor voltage integration register for each motor;
    setting motor drive DACs to zero when the motors are rotating in the backward direction so that motor current is set at zero and the motors are coasting in a backward direction;

measuring the motor torque constants for the backward direction by integrating the motor generated voltage over a fixed angle of motor rotation for each motor; and storing the integrated motor torque constant from the backward measurement in a motor voltage integration register for each motor to arrive at an integral of motor voltage over two revolutions.

5. The method of claim 1 wherein the collecting of calibration data for the motor friction and DAC offsets further comprises:

setting reel motors at a constant speed in a forward direction;

when constant speed in the forward direction has been established, accumulating a value of each of the motor drive DACs at predetermined time intervals for a preset time period;

at the end of the preset time period, storing the motor friction values into motor friction registers, wherein the value stored in the motor friction register represent the number of predetermined time intervals collected times the forward friction current for the motors;

copying accumulated DAC values into DAC offset calibration registers;

setting reel motors at constant speed in the backward direction;

when constant speed in the backward direction has been established, accumulating a value of each of the motor drive DACs at the predetermined time intervals for the preset period of time;

subtracting DAC values collected in the backward direction from the DAC values copied into the DAC offset registers after the forward collection; and dividing the values of the motor friction registers and the DAC offset registers by the sum of the number of predetermined time intervals spanning the forward and backward collection to yield the final values for calibration of motor friction and DAC offset.

6. The method of claim 1 wherein the collecting of calibration data for the motor torque further comprises:

setting motor drive DACs to zero when the motors are rotating in the forward direction so that motor current is set at zero and the motors are coasting in a forward direction;

measuring the motor torque constants for the forward direction by integrating the motor generated voltage over a fixed angle of motor rotation for each motor;

storing the integrated motor torque constant from the forward measurement in a motor voltage integration register for each motor;

setting motor drive DACs to zero when the motors are rotating in the backward direction so that motor current is set at zero and the motors are coasting in a backward direction;

measuring the motor torque constants for the backward direction by integrating the motor generated voltage over a fixed angle of motor rotation for each motor; and storing the integrated motor torque constant from the backward measurement in a motor voltage integration register for each motor to arrive at an integral of motor voltage over two revolutions.

7. A method for calibrating a tape transport servo system for a tape drive, comprising:

exciting tape reel motors when the tape drive is not being controlled by the tape transport servo system; and collecting calibration data for the pulse width modulator (PWM) control signal timing by enabling the drive amplifiers to activate the pulse width modulator control signals, measuring the on-time and the off-time for the pulse width modulator control signal, averaging the on-time and off-time measurements to reduce measurement noise and storing the averaged measured values for each reel motor driver.

8. A method for calibrating a tape transport servo system for a tape drive, comprising:

exciting tape reel motors when the tape drive is not being controlled by the tape transport servo system; and collecting calibration data for motor friction and DAC offsets by setting reel motors at a constant speed in a forward direction, accumulating a value of each of the motor drive DACs at predetermined time intervals for a preset time period when constant speed in the forward direction has been established, storing the motor friction values into motor friction registers at the end of the preset time period, wherein the value stored in the motor friction register represent the number of predetermined time intervals collected times the forward friction current for the motors, copying accumulated DAC values into DAC offset calibration registers, setting reel motors at constant speed in the backward direction, accumulating a value of each of the motor drive DACs at the predetermined time intervals for the preset period of time when constant speed in the backward direction has been established, subtracting DAC values collected in the backward direction from the DAC values copied into the DAC offset registers after the forward collection and dividing the values of the motor friction registers and the DAC offset registers by the sum of the number of predetermined time intervals spanning the forward and backward collection to yield the final values for calibration of motor friction and DAC offset.

9. A method for calibrating a tape transport servo system for a tape drive, comprising:

exciting tape reel motors when the tape drive is not being controlled by the tape transport servo system; and collecting calibration data for the motor torque by setting motor drive DACs to zero when the motors are rotating in the forward direction so that motor current is set at zero and the motors are coasting in a forward direction, measuring the motor torque constants for the forward direction by integrating the motor generated voltage over a fixed angle of motor rotation for each motor, storing the integrated motor torque constant from the forward measurement in a motor voltage integration register for each motor, setting motor drive DACs to zero when the motors are rotating in the backward direction so that motor current is set at zero and the motors are coasting in a backward direction, measuring the motor torque constants for the backward direction by integrating the motor generated voltage over a fixed angle of motor rotation for each motor and storing the integrated motor torque constant from the backward measurement in a motor voltage integration register for each motor to arrive at an integral of motor voltage over two revolutions.

10. A method for calibrating a tape transport servo system for a tape drive, comprising:

clearing motor calibration data;

performing pulse width modulator control signal timing measurements to obtain offset timings for each of the reel motors;

accelerating the reel motors up to speed in the forward
direction to collect DAC offset data, motor friction data
and motor torque data;

accelerating the reel motors up to speed in the backward
direction to collect DAC offset data, motor friction data
and motor torque data;

processing the gathered calibration parameters for the
pulse width modulator control signal timing, DAC
offsets, the motor friction and the motor torque to arrive
at final calibration data for use in the tape transport
servo control system; and storing the final calibration data into a calibration data
structure.

11. The method of claim 10 wherein the processing further comprises scaling the motor torque constant for use in the tape transport servo control system, wherein the scale factor for torque constant from summation of e(t) over two revolutions is given by SF=(total angle)*(volt-scale-factor)*(1/torque-Q-factor)*(sample-frequency).

12. A tape drive, comprising a controller, the controller being configured to calibrate a tape transport servo system by exciting tape reel motors when the tape drive is not being controlled by the tape transport servo system and collecting calibration data for the motor torque, motor friction, DAC offsets, and pulse width modulator control signal timing.

13. A tape drive, comprising a controller, the controller being configured to calibrate a tape transport servo system by clearing motor calibration data;

performing pulse width modulator control signal timing
measurements to obtain offset timings for each of the
reel motors;

accelerating the reel motors up to speed in the forward
direction to collect DAC offset data, motor friction data
and motor torque data;

accelerating the reel motors up to speed in the backward
direction to collect DAC offset data, motor friction data
and motor torque data;

processing the gathered calibration parameters for the
pulse width modulator control signal timing, DAC
offsets, the motor friction and the motor torque to arrive
at final calibration data for use in the tape transport
servo control system; and storing the final calibration data into a calibration data
structure.

14. An article of manufacture comprising a program storage medium readable by a computer, the medium tangibly embodying one or more programs of instructions executable by the computer to perform a method for calibrating a tape transport servo system, the method comprising:

exciting tape reel motors when the tape drive is not being
controlled by the tape transport servo system; and collecting calibration data for the motor torque, motor
friction, DAC offsets, and pulse width modulator control signal timing.

15. An article of manufacture comprising a program storage medium readable by a computer, the medium tangibly embodying one or more programs of instructions executable by the computer to perform a method for calibrating a tape transport servo system, the method comprising:

clearing motor calibration data;

performing pulse width modulator control signal timing
measurements to obtain offset timings for each of the
reel motors;

accelerating the reel motors up to speed in the forward
direction to collect DAC offset data, motor friction data
and motor torque data;

accelerating the reel motors up to speed in the backward
direction to collect DAC offset data, motor friction data
and motor torque data;

processing the gathered calibration parameters for the
pulse width modulator control signal timing, DAC
offsets, the motor friction and the motor torque to arrive
at final calibration data for use in the tape transport
servo control system; and storing the final calibration data into a calibration data
structure.

* * * * *

UNITED STATES PATENT AND TRADEMARK OFFICE
CERTIFICATE OF CORRECTION

PATENT NO. : 6,760,176 B2
DATED : July 6, 2004
INVENTOR(S) : Koski

It is certified that error appears in the above-identified patent and that said Letters Patent is hereby corrected as shown below:

Column 6,
Line 55, "analog convertors (DACs)" should read -- analog converters (DACs) --.

Column 7,
Line 44, "This PWM signal" should read -- This PWM signal --.

Column 8,
Line 38, "First, the motor toque constant," should read -- First, the motor torque constant, --.

Column 9,
Line 4, " The motor toque constant," should read -- The motor torque constant, --.
Line 25, "registers 1012" should read -- registers 1012. --.

Signed and Sealed this

Fourteenth Day of December, 2004

JON W. DUDAS
*Director of the United States Patent and Trademark Office*